(12) United States Patent
Osaki

(10) Patent No.: US 6,998,089 B2
(45) Date of Patent: Feb. 14, 2006

(54) MOLDING TOOL AND METHOD OF FABRICATION THEREOF

(75) Inventor: Tokihito Osaki, Aichi (JP)

(73) Assignee: Kabushiki Kaisha Tokai Model, Aichi (JP)

( * ) Notice: Subject to any disclaimer, the term of this patent is extended or adjusted under 35 U.S.C. 154(b) by 433 days.

(21) Appl. No.: 10/177,159

(22) Filed: Jun. 24, 2002

(65) Prior Publication Data

US 2003/0011106 A1 Jan. 16, 2003

(30) Foreign Application Priority Data

Jul. 16, 2001 (JP) .................................... 2001-215283
May 16, 2002 (JP) .................................... 2002-141353

(51) Int. Cl.
B29C 33/40 (2006.01)

(52) U.S. Cl. ...................... 264/401; 264/401; 249/134
(58) Field of Classification Search ................ 264/219, 264/220, 221, 227, 401; 249/134
See application file for complete search history.

(56) References Cited

U.S. PATENT DOCUMENTS 5,489,410 A * 2/1996 Baumgartner et al. ...... 264/219

FOREIGN PATENT DOCUMENTS

| JP | 57-157705 A1 | 9/1982 |
| JP | 57-159610 A1 | 10/1982 |

OTHER PUBLICATIONS

European Search Report dated Nov. 8, 2002.
Paradis R: A comparison of the Conventional Machined Aluminum and Rapid Epoxy Shell Prototype Mold Building Processes: Journal of Injection Molding Technology, Society of Plastics Engineers, Brookfield, CT, US, vol. 2, No. 1, Mar. 1, 1998, pp. 8–17, XP000740773, ISSN: 1533–905X* p. 11, column 2—p. 13, column 1, paragraph 1*.
Gebhardt A: "Rapid Tooling Der Schnelle Weg Zum Spritzgiesswerkzeug" Kunststoffe, Carl Hanser Verlag. Munchen, DE, vol. 88, No. 11, Nov. 1998, pp. 1992–1994, 1996, 1998, 2000, XP000906260, ISSN: 0023–5563* p. 1993, column 2, paragraph 3—column 3, paragraph 1* * p. 1994, column 3, last paragraph—p. 1996, column 1*.

* cited by examiner

Primary Examiner—Donald Heckenberg
(74) Attorney, Agent, or Firm—Rader, Fishman & Grauer PLLC

(57) ABSTRACT

A molding tool and a method of fabrication thereof which can reduce the fabrication period remarkably, are disclosed. In particular, a molding tool and a method of fabrication thereof which are most suitable for producing a small lot of plastic molded objects used for preparing prototype parts or the like are proposed. Thin die surface layers (20, 30) each having a predetermined die surface shape (C1, C2) are formed by a stereolithography method using a stereolithography material or a powder sinter molding method using a powder molding material. Reinforcing rib portions (25, 35) are formed integrally with the thin die surface layers by the stereolithography method or the powder sinter molding method on the back surface of the thin die surface layers, respectively. Back reinforcement resin layers (26, 36) are filled integrally in the space of the reinforcing rib portions on the back surface of the thin die surface layers.

8 Claims, 3 Drawing Sheets

MOLDING TOOL AND METHOD OF FABRICATION THEREOF

BACKGROUND OF THE INVENTION

1. Field of the Invention

The present invention relates to a molding tool and a method of fabricating the same and, in particular, to a molding tool used for producing a small number of plastic molded objects by injection molding or low-pressure RIM molding.

2. Description of the Related Art

The molding tools for producing plastic molded objects including large-sized parts (bumper, instrument panel, back door panel, etc. of automotive vehicles) and medium-sized parts (door trim, pillar, electric parts, etc. of automotive vehicles) by injection molding or low-pressure RIM molding are often configured of a cavity die with a die surface depressed and a core die with a protruded die surface in the shape of the molded object. To obtain these molding tools, a master model of a wooden pattern is fabricated normally. The surface shape of the master model is copied by silicon resin, epoxy resin or the like to produce a cavity die. Then, a member incorporating the surface shape of the depressed side of a product is mounted in the cavity die, and a core die is produced by copying the member by using the resin. This fabrication method using a master model requires four to six weeks to produce a series of dies including a master model, a cavity die and a core die, resulting in a high production cost for a molding tool.

In another conventional method of fabricating a molding tool, the three-dimensional data of a product are obtained by actual measurements or CAD data to produce the surface data of a cavity die and a core die, and based on these data, a steel block, rolled aluminum, a zinc alloy casting, etc. is milled on a CNC machine tool thereby to produce a cavity die and a core die. In this method, a plurality of milling steps are required for milling a complicated surface and the milling tool must be changed for each machining step. For this reason, the fabrication of a molding tool by this method takes as long as one to three months, with the natural result that the cost for fabrication of the molding tool tends to increase.

As described above, the conventional methods require a long period of time for fabricating a molding tool. On the other hand, it is earnestly desired that a molding tool used for producing prototype parts, which may be accompanied by frequent design changes, be fabricated rapidly in keeping with each design change. Also, there has recently been a demand for a molding tool low in cost and short in delivery time, which is suited to small quantity production up to twenty or thirty thousand of plastics parts.

SUMMARY OF THE INVENTION

This invention has been achieved in view of the points described above, and an object thereof is to provide a molding tool and a method of fabrication thereof by which the fabrication period can be remarkably shortened.

Another object of the invention is to provide a molding tool and a method of fabrication thereof most suitable for producing a small lot number of plastics molded objects for prototype parts or small quantity production up to twenty or thirty thousand, at most.

According to the first aspect of the invention, there is provided a molding tool comprising a pair of thin die surface layers each having a predetermined die surface shape formed by a selected stereolithography method using a stereolithography material and a powder sinter molding method using a powder molding material, a pair of reinforcing rib portions each formed integrally with the corresponding one of the thin die surface layers on the back side surface of the thin die surface layer by a selected stereolithography method and a powder sinter molding method, and a pair of back reinforcement resin layers each filled integrally in the space of the corresponding one of the reinforcing rib portions on the back side surface of the thin die surface layer.

According to the second aspect of the invention, there is provided a method, of fabricating a molding tool, comprising the steps of forming a pair of thin die surface layers, each having a predetermined die surface shape, integrally with the corresponding one of a pair of reinforcing rib portions on the back surface side of the corresponding one of the thin die surface layers by a selected stereolithography method using a stereolithography material and a powder sinter molding method using a powder molding material, and forming each of a pair of back reinforcement resin layers integrally by casting a back reinforcement resin material into the space in the corresponding one of the reinforcing rib portions on the back surface side of the thin die surface layer.

According to the third aspect based on the second aspect of the invention, there is provided a method, of fabricating a molding tool, wherein the stereolithography material is a heat-resistant resin material having the heat distortion temperature of not lower than 50° C.

According to the fourth aspect based on the third aspect of the invention, there is provided a method, of fabricating a molding tool, wherein the stereolithography material is a selected one of an epoxy resin material, a urethane resin material and an acryl resin material.

According to the fifth aspect based on the second aspect of the invention, there is provided a method, of fabricating a molding tool, wherein the powder molding material used for the powder sinter molding method is a selected one of an organic material composed of a thermoplastic resin material having a heat distortion temperature of not lower than 80° C. including a selected one of polyamide resin, ABS resin and polyvinyl chloride resin and an inorganic material including a selected one of copper, nickel, stainless steel and an alloy thereof.

According to the sixth aspect based on the second aspect of the invention, there is provided a method, of fabricating a molding tool, wherein the thickness of the thin die surface layers is not less than 0.1 mm.

According to the seventh aspect based on the second aspect of the invention, there is provided a method, of fabricating a molding tool, wherein the interval between adjacent reinforcing ribs of the reinforcing rib portions is not less than 10 mm.

According to the eighth aspect based on the second aspect of the invention, there is provided a method, of fabricating a molding tool, wherein the thickness of each rib of the reinforcing rib portion is not less than 0.1 mm.

According to the ninth aspect based on the second aspect of the invention, there is provided a method, of fabricating a molding tool, wherein the height of at least one of the ribs of each of the reinforcing rib portions is not less than 5 mm from the back surface of the corresponding one of the thin die surface layers, the maximum height of the ribs extending from the back surface to the corresponding die bottom portion.

According to the tenth aspect based on the second aspect of the invention, there is provided a method, of fabricating a molding tool, wherein the back reinforcement resin layer is in the form of liquid or putty composed of a selected one of epoxy resin, urethane resin and polyester resin mixed with a selected one or more of inorganic fillers and one or more of organic fillers separately or simultaneously.

According to the 11th aspect based on the second aspect of the invention, there is provided a method, of fabricating a molding tool, wherein a core portion is arranged on the back surface of the corresponding one of the reinforcing rib portions.

According to the 12th aspect based on the 11th aspect of the invention, there is provided a method, of fabricating a molding tool, wherein the core portion is composed of a selected one of polyethylene resin, polypropylene resin, polystyrene resin, ABS resin, polyamide resin, polyethylene fluoride resin, polyurethane resin and a foamed material of any of the resins.

According to the 13th aspect based on the 11th aspect of the invention, there is provided a method, of fabricating a molding tool, wherein the core portion is composed of a selected one of zinc alloy, aluminum, cast iron and steel.

DESCRIPTION OF THE PREFERRED EMBODIMENTS

This invention will be explained in detail below with reference to the accompanying drawings.

Figure 1:
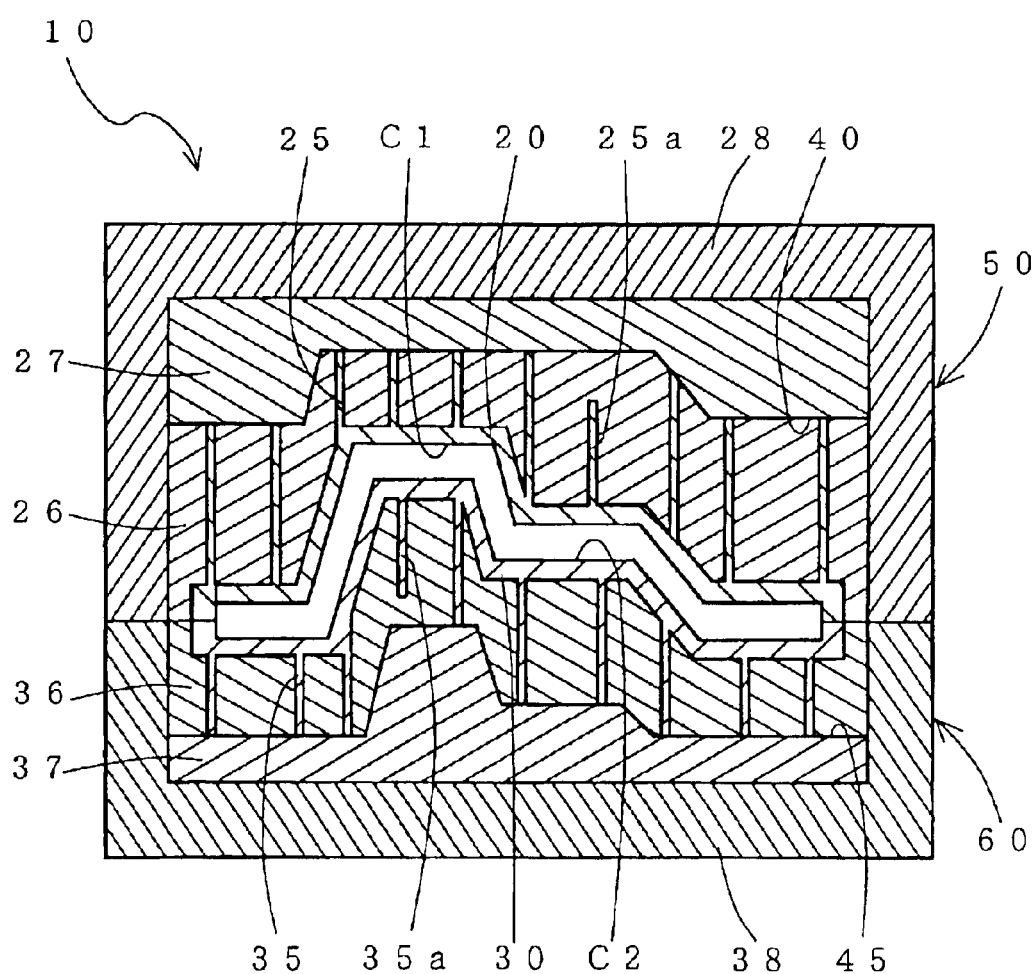
FIG. 1 is a sectional view of a molding tool according to an embodiment of the invention.
Figure 2:
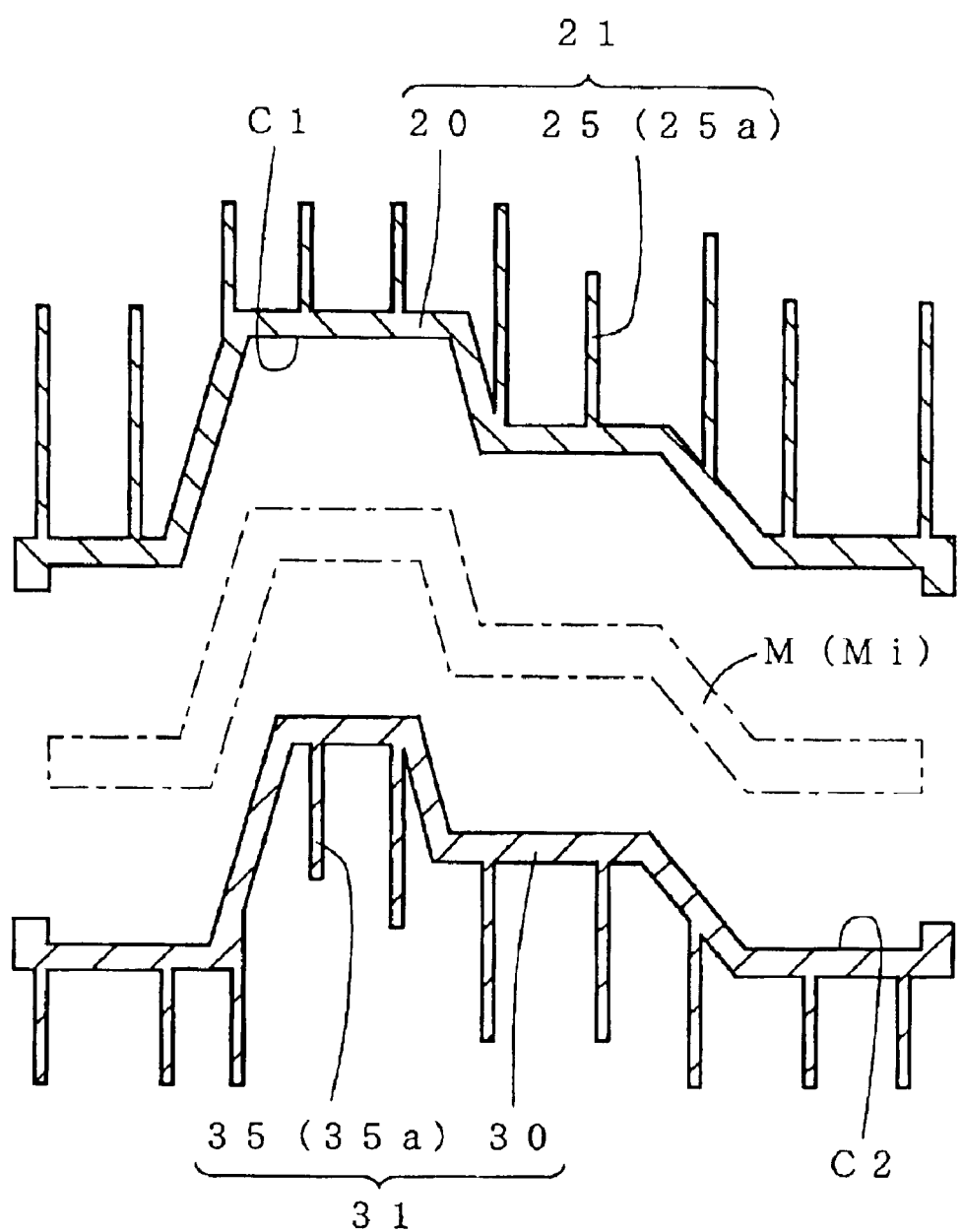
FIG. 2 is a sectional view showing the process for forming a thin die surface layer and a reinforcing rib portion integrally.
Figure 3:
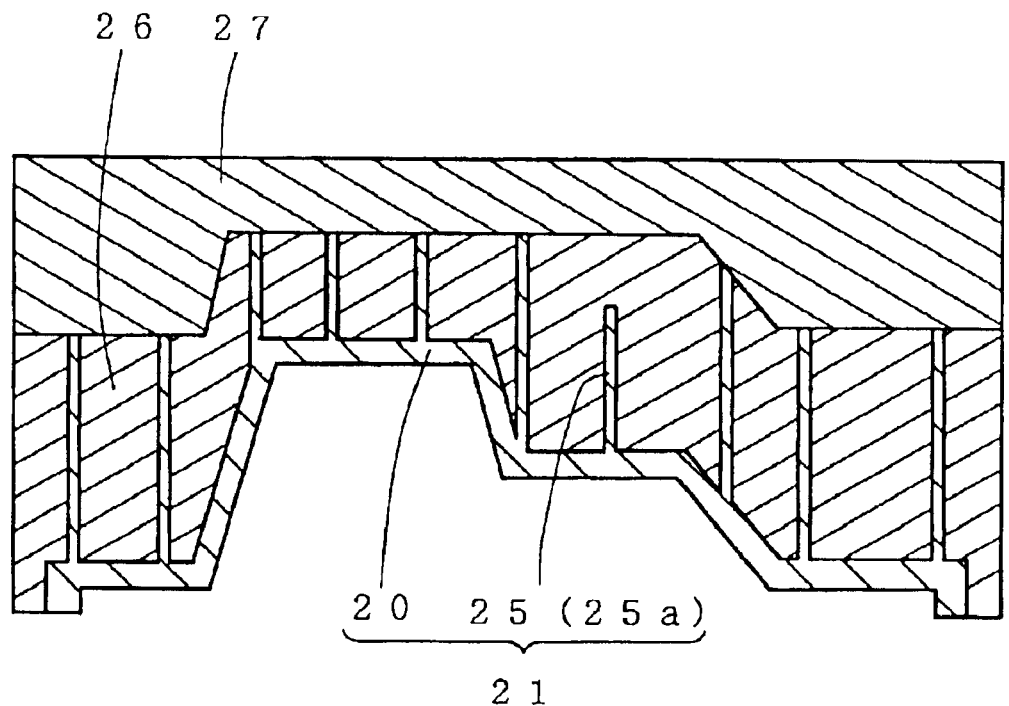
FIG. 3 is a sectional view showing the process for forming a back reinforcement resin layer following the process of FIG. 2.
Figure 3:
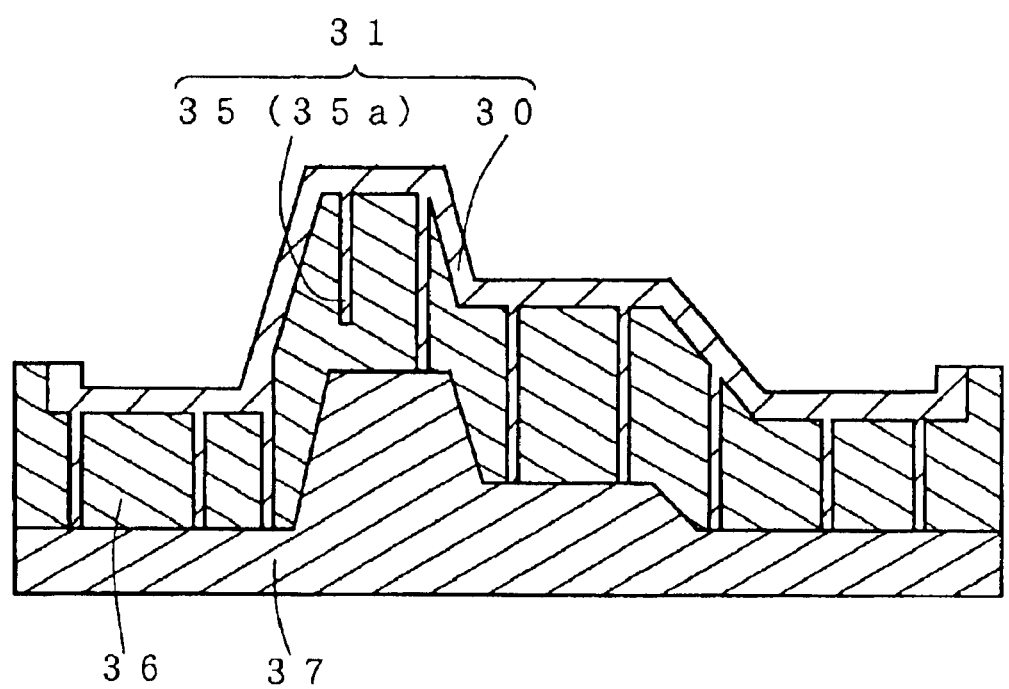

FIG. 1 is a sectional view of a molding tool according to an embodiment of the invention, FIG. 2 a sectional view showing the process for forming a thin die surface layer and a reinforcing rib portion integrally with each other, and FIG. 3 a sectional view showing the process for forming a back reinforcement resin layer following the process of FIG. 2.

A molding tool 10 shown in FIG. 1 includes thin die surface layers 20, 30 having predetermined die surface shapes C1, C2, respectively, formed of a stereolithography material, and reinforcing rib portions 25, 35 formed of a stereolithography material integrally with the thin die surface layers 20, 30, respectively, on the back surface of the thin die surface layers 20, 30, wherein back reinforcement resin layers 26, 36 are filled integrally in the space of the reinforcing rib portions 25, 35 on the back surface of the thin die surface layers 20, 30. In the embodiment shown, the molding tool 10 is configured of a cavity die 50 and a core die 60. Reference numerals 25a, 35a designate reinforcing ribs not reaching the die bottom portions 40, 45, respectively, numerals 27, 37 core portions, and numerals 28, 38 mold bases. This molding tool and a method of fabrication thereof will be described in detail below.

The method of fabricating the molding tool 10 comprises the steps of forming the thin die surface layers 20, 30 and the reinforcing rib portions 25, 35 integrally with each other, and forming the back reinforcement resin layers 26, 36 integrally.

The step of forming the thin die surface layers 20, 30 and the reinforcing rib portions 25, 35 integrally with each other will be explained with reference to FIGS. 1 and 2. First, before this step, numerical data Mi for the shape M of a molded object are prepared as shown in FIG. 2. This shape data is developed on a three-dimensional CAD system from the skeleton data and the surface data of the molded object. Next, the thickness data is set for the data on the shape M of the molded object. As a result, the thickness and shape of the thin die surface layers 20, 30 to be formed are determined. The thickness of the thin die surface layers 20, 30 is required to be not less than 0.1 mm, and is normally determined appropriately in the range of 1 to 5 mm in accordance with the die surface shape, etc.

Further, in addition to the thickness data, the rib data, which include the position, shape and thickness of the ribs of the reinforcing rib portions 25, 35 formed on the back surface side of the thin die surface layers 20, 30 are produced. The interval between each adjacent ribs of the reinforcing rib portions 25, 35 is appropriately set to 10 mm or more. Each rib of the reinforcing rib portions 25, 35 has a thickness of not less than 0.1 mm as appropriately determined in accordance with the die surface shape, etc. As designated by reference numerals 25a, 35a in FIG. 1, the height of the reinforcing ribs may not reach the die bottom portions 40, 45. In such a case, the height of the reinforcing ribs 25a, 35a is appropriately determined in the range of 5 mm to a maximum distance from the back surface of the thin die surface layers 20, 30 to the die bottom portions 40, 45. The interval, thickness, height, etc. of the reinforcing ribs are not numerically limited, but may take any value as far as the dimensional accuracy of the die surface shape and the die surface can be maintained as designed. Also, the reinforcing rib portions 25, 35 can take any of the shapes including grid, honeycomb, etc. which can exhibit the effect of reinforcing ribs.

The shape data, the thickness data and the rib data of the molded object described above are produced as numerical data on a three-dimensional CAD system. As described above, the numerical data for the die surface shapes C1, C2 of the cavity die 50 and the core die 60 are of course prepared. Based on these data, the thin die surface layers 20, 30 and the reinforcing rib portions 25 (25a), 35 (35a) are integrally formed using a stereolithography material.

Specifically, in the integrally forming step described above, the three-dimensional data are input to a well-known stereolithography system, and a stereolithography material is optically molded by the laser beam emitted from the stereolithography system. In this way, integrated molds 21, 31 of the thin die surface layers 20, 30 and the reinforcing rib portions 25 (25a), 35 (35a), as shown in FIG. 2, are obtained.

A heat-resistant resin material having a heat distortion temperature of not lower than 50° C. is used as a stereolithography material for the integrally forming step described above. As a result, the heat resistance of the molding tool can be improved. The stereolithography material includes an epoxy resin material, a urethane resin material or an acrylic resin material. As an actual example, a thermoplastic resin material such as polyethylene resin, polystyrene resin, polypropylene resin or ABS resin used in the injection molding process may be heated to about 200° C. In such a molding process, a stereolithography material having a heat distortion temperature of not lower than 80° C. is used. On the other hand, a stereolithography material having a heat distortion temperature of not lower than 50° C. is used for the RIM molding of polyurethane resin or the like.

According to this embodiment, the stereolithography system "SLA7000" of 3D Systems Inc. (USA), and the data processing software "3D Lightyear, Buildstation 5.0" are used. Also, the epoxy resin "SL5530IIT" of Vantico Corporation (USA) is used as a stereolithography material, for which the heat resistance of not lower than about 120° C. could be obtained by heating for 5 hours at 80° C. after the stereolithography process in the stereolithography system described above.

As a method of fabricating a molding tool other than the stereolithography described above, a powder sinter molding method can be used. In the method of fabricating the molding tool using the powder sinter molding process, a thin die surface layer having a predetermined die surface shape formed by the powder sinter molding method using a powder molding material and a reinforcing rib portion can be formed integrally with each other by the powder sinter molding method on the back surface of the thin die surface layer. An organic material composed of a thermoplastic resin such as polyamide resin, ABS resin or polyvinyl chloride resin having a heat distortion temperature of not lower than 80° C. or an inorganic material composed of copper, nickel, stainless steel or an alloy thereof is used as the powder molding material. In the powder sinter molding method according to this embodiment, a SLS system "Vanguard HS" of 3D Systems Inc. (USA) is used. Also, Duraform Polyamide of 3D Systems Inc. (USA) is used as an organic material, and the stainless steel powder "Laser Form ST-100" of 3D Systems Inc. (USA) as an inorganic material.

Next, as shown in FIG. 3, a back reinforcement resin material is cast in the space of the integrated molds 21, 31 of the thin die surface layers 20, 30 and the reinforcing rib portions 25 (25a), 35 (35a) thereby to form the back reinforcement resin layers 26, 36 integrally. The back reinforcement resin layers 26, 36 are for back reinforcement to reinforce the integrated molds 21, 31 of the thin die surface layers 20, 30 and the reinforcing rib portions 25 (25a), 35 (35a) of the stereolithography material. The back reinforcement resin material is desirably suited to the cast molding, takes a liquid or putty form and is produced by mixing epoxy resin, urethane resin or polyester resin, separately or simultaneously, with one or more of inorganic fillers and one or more of organic fillers. Instead of the epoxy resin mixed with aluminum powder ("Quinnate MEZ Series MEZ300" of "Vantico K.K. Japan") used in this embodiment, concrete, reinforced concrete or a compound composed of a mixture of urethane resin or unsaturated polyester resin and inorganic fillers and organic fillers are also recommendable.

The molding tool shown in FIG. 3 also comprises core portions 27, 37 formed on the back surface of the reinforcing rib portions 25, 35, respectively. The core portions 27, 37, as shown in FIG. 3 (and FIG. 1), can further increase the die strength by being closely attached to the resin layers 26, 36 on the back surface of the reinforcing rib portions 25, 35, respectively. The core portions 27, 37 are composed of a material such as polyethylene resin, polypropylene resin, polystyrene resin, ABS resin, polyamide resin, polyethylene fluoride resin, polyurethane resin or a foamed material thereof for the RIM molding tool on the one hand, and a high-strength metal of zinc alloy, aluminum, cast iron or steel for the injection molding tool on the other hand. In addition to the above-mentioned materials, concrete or reinforced concrete can be used for the core portions 27, 37.

Though not shown, instead of providing the core portions 27, 37, a back reinforcement resin material may be filled by casting into the integrated molds 21, 31 of the thin die surface layers 20, 30 and the reinforcing rib portions 25 (25a), 35 (35a). In this case, the back reinforcement resin layers 26, 36 are formed by casting a back reinforcement resin material into the space between the mold bases 28, 38 and the integrated molds 21, 31 of the thin die surface layers 20, 30 and the reinforcing rib portions 25 (25a), 35 (35a), respectively. In the case where a sufficient die strength can be secured by use of a high-strength material such as zinc alloy casting, rolled aluminum or cast iron for the core portions 27, 37 shown in FIGS. 1 and 3, on the other hand, the mold bases 28, 38 shown in FIG. 1 may be done without.

As described above with reference to the accompanying drawings, the thin die surface layers having a predetermined die surface shape are formed by the stereolithography process using a stereolithography material or the powder sinter molding method using a powder molding material, and the reinforcing rib portions are formed integrally with the thin die surface layers by the stereolithography method or the powder sinter molding method on the back surface of the thin die surface layers, respectively. In this way, the shape accuracy and the dimensional accuracy of the die surfaces of a molding tool, meeting design requirements, can be maintained even for large items without supporting the thin die surface layers with holders or the like. Also, the shape accuracy and the dimensional accuracy, meeting the design requirements, can be easily maintained by filling a back reinforcement resin layer integrally in the space of the reinforcing rib portions on the back surface side of the thin die surface layers.

Also, according to this invention, a predetermined die surface shape is formed by the thin die surface layers composed of a stereolithography material or a powder molding material. Therefore, a molding tool can be fabricated simply and easily without proceeding through the complicated steps for preparing a master model or milling a steel block unlike in the prior art. Thus, the production period of a molding tool can be remarkably reduced.

Further, the reinforcing rib portions are integrally formed of the same stereolithography material or the same powder molding material as the thin die surface layers on the back surface of the thin die surface layers having a die surface shape, and a back reinforcement resin layer is integrally formed by being cast in the space of the reinforcing rib portions on the back surface of the thin die surface layers. Therefore, a sufficient die strength can be secured. In addition, the core portions can be formed as required, thereby making it possible to further increase the die strength.

Furthermore, in the case where the stereolithography material is a heat-resistant resin material having a heat distortion temperature of not lower than 50° C., the invention is applicable satisfactorily to injection molding or RIM molding that uses high-temperature materials.

According to this invention having the features described above, there is provided a molding tool and a method of fabricating the molding tool most suitable for production of a small lot of plastic molded objects used for preparation of prototype parts, which must be fabricated rapidly to meet frequent design changes, or a small quantity production up to twenty or thirty thousand of plastic molded objects, which must be fabricated rapidly to meet frequent design changes.

What is claimed is:

1. A method of fabricating a molding tool comprising the steps of:

forming a pair of thin die surface layers, each having a predetermined die surface shape, integrally with the corresponding one of a pair of reinforcing rib portions on the back surface of the corresponding one of said thin die surface layers by a stereolithography method using a stereolithography material, and forming each of a pair of back reinforcement resin layers integrally by casting a back reinforcement resin material into a space of the corresponding one of said reinforcing rib portions on the back surface of thin die surface layer, wherein a core portion is arranged on the back surface of the corresponding one of said reinforcing rib portions and said core portion is composed of a selected one of polyethylene resin, polypropylene resin, polystyrene resin, ABS resin, polyamide resin, polyethylene fluoride resin, polyurethane resin and a foamed material of any of said resins.

2. A method of fabricating a molding tool according to claim 1, wherein said stereolithography material is a heat-resistant resin material having a heat distortion temperature of not lower than 50° C.

3. A method of fabricating a molding tool according to claim 2, wherein said stereolithography material is a selected one of an epoxy resin material, an urethane resin material and an acryl resin material.

4. A method of fabricating a molding tool according to claim 1, wherein the thickness of said thin die surface layers is not less than 0.1 mm.

5. A method of fabricating a molding tool according to claim 1, wherein the interval between each adjacent said reinforcing ribs of said reinforcing rib portions is not less than 10 mm.

6. A method of fabricating a molding tool according to claim 1, wherein the thickness of each rib of said reinforcing rib portions is not less than 0.1 mm.

7. A method of fabricating a molding tool according to claim 1, wherein the height of at least one of the ribs of each of said reinforcing rib portions is not less than 5 mm from the back surface of the corresponding one of said thin die surface layers, the maximum height extending from said back surface to the corresponding die bottom portion.

8. A method of fabricating a molding tool according to claim 1, wherein said back reinforcement resin layer is in the form of liquid or putty composed of a selected one of epoxy resin, urethane resin and polyester resin mixed with a selected one or more of inorganic fillers and one or more of organic fillers separately or simultaneously.

* * * * *